US005242090A

United States Patent [19]

Reyss

[11] Patent Number: 5,242,090

[45] Date of Patent: Sep. 7, 1993

[54] DEVICE FOR SPRAYING A LIQUID PRODUCT, ESPECIALLY A HAIR PRODUCT, IN FINE DROPLETS

[75] Inventor: Yvon Reyss, Paris, France

[73] Assignee: L'Oreal, Paris, France

[21] Appl. No.: 865,189

[22] Filed: Apr. 8, 1992

[30] Foreign Application Priority Data

Apr. 19, 1991 [FR] France ............................... 91 04852

[51] Int. Cl.[5] ............................................. G01F 11/02

[52] U.S. Cl. .................................... 222/321; 222/153; 222/402.13; 222/402.15

[58] Field of Search ...................... 222/402.13, 402.15, 222/321, 470, 472, 473, 474, 153, 402.1, 402.11

[56] References Cited

U.S. PATENT DOCUMENTS

| | | | |
|---|---|---|---|
| 3,138,331 | 6/1964 | Kutik | 222/402.15 X |
| 3,149,761 | 9/1964 | Harris et al. | 222/402.15 X |
| 4,124,148 | 11/1978 | Vieler et al. | 222/402.15 X |
| 4,186,855 | 2/1980 | Edman et al. | 222/472 X |
| 4,506,808 | 3/1985 | Goncalves . | |
| 4,676,408 | 6/1987 | Speitel . | |
| 5,139,180 | 8/1992 | Lucas | 222/402.13 |

FOREIGN PATENT DOCUMENTS

| | | | |
|---|---|---|---|
| 529646 | 6/1980 | Australia . | |
| 0168285 | 1/1986 | European Pat. Off. . | |
| 0402636 | 12/1990 | European Pat. Off. . | |
| 2151327 | 5/1972 | Fed. Rep. of Germany | 222/402.13 |
| 3244645 | 6/1983 | Fed. Rep. of Germany . | |
| 2319540 | 2/1977 | France . | |
| 2394467 | 2/1979 | France | 222/402.15 |
| 2398196 | 2/1979 | France | 222/402.13 |
| 2477102 | 9/1981 | France . | |
| 2517639 | 6/1983 | France . | |
| 5524864 | 10/1983 | France . | |
| 2530586 | 1/1984 | France . | |
| 1547072 | 6/1979 | United Kingdom . | |
| 2124711 | 2/1984 | United Kingdom . | |

*Primary Examiner*—Kevin P. Shaver
*Attorney, Agent, or Firm*—Cushman, Darby & Cushman

[57] ABSTRACT

The device comprises a container (2) provided in its upper part with a distributor head (4) offset towards the front with respect to the axis (A) of the container, which can be actuated by depression and which can rotate about an axis (B) parallel to its direction of depression, and a cap (12) provided with an actuating lever (14) hinged on to the front and having a support (P) for acting on the head (4) when a user applies pressure to the rear part of the lever. The cap (2) has an opening (26) for the passage of the sprayed product. Guide elements are provided between the cap (12) and the container (2) so that the cap is mounted in a predetermined angular direction in such a manner that the opening (26) is situated at right angles with the outlet (8) of the distributor head (4), and the support (P) can act on the head (4) when the various elements have been assembled in the correct angular position.

7 Claims, 2 Drawing Sheets

DEVICE FOR SPRAYING A LIQUID PRODUCT, ESPECIALLY A HAIR PRODUCT, IN FINE DROPLETS

FIELD OF THE INVENTION

The invention relates to a device for spraying a liquid product in fine droplets, of the type comprising a container provided in its upper part with a distributor head which can be actuated by depression and which can rotate about an axis parallel to a direction of depression, and a cap covering the head and the container, this cap comprising an actuating member in the form of a lever hinged on to the front of the cap and having a supporting means for acting on the distributor head when a user applies pressure to the rear part of the lever, the said distributor head being offset towards the front of the cap with respect to the axis of the container, and having an outlet for the product towards the atmosphere, the cap having an opening for the passage of the sprayed product.

The invention relates more particularly, but not exclusively, to a device in which the distributor head forms the actuating element of a pump mounted on the upper part of the container, said container not being pressurised when the pump is not actuated.

However, this distributor head can clearly be provided on a pressurised container, depression of the head then simply resulting in the opening of a valve, without actuation of a pump.

DESCRIPTION OF THE PRIOR ART

EP-A-0 402 636 shows a device of this kind, in which, however, the relative positions of the actuating member, the distributor head and the opening of the cap are not ensured in a precise manner.

FR-A-2 517 639 and FR-A-2 524 864 show a device for spraying a liquid product contained in a pressurised container, having a cap with an actuating member in the form of a lever for the depression of a valve. Although a device of this kind is satisfactory for the actuation of a valve provided on a pressurised container, the actuating lever, provided with internal ducts, must be produced as a separate component from the cap. A device of this kind is not suitable for the actuation of a distributor head mounted on a hand pump.

SUMMARY OF THE INVENTION

The object of the invention is above all to provide a device which no longer has, or has to a lesser extent, the disadvantages mentioned hereinabove, and which is very suitable for the distribution of fine droplets from a non-pressurised container provided with a hand pump, while still being simple and having a low cost price, and the assembly of which makes it possible to ensure and maintain correct positioning of the actuating member, the distributor head and the opening of the cap.

According to the invention, a device for spraying a liquid product in fine droplets of the type defined hereinbefore is characterised in that guide means are provided between the cap and the container so that the cap is mounted in a predetermined angular direction relative to the container, in such a manner that the opening of the cap is situated at right angles with the outlet of the distributor head and the supporting means can act on the head when the various elements have been assembled in the correct angular position.

The guide means between the cap and the container are preferably formed by the shape of the transverse section of the container which is asymmetrical relative to the longitudinal axis of the container, so that the cap can only be mounted on this container in one single angular direction.

The distributor head may have an outlet for the product in a direction transverse, generally perpendicular, to the direction of depression of the head, and the opening of the cap is provided in the peripheral wall of this cap. The distributor head then has angular positioning means capable of cooperating with the supporting means of the lever, this supporting means being adapted so as to define a predetermined angular position between the distributor head and the cap.

The angular positioning means of the distributor head may comprise, at the head side, a step provided on the upper surface of this head and, at the actuating member side, a supporting means formed by several elements projecting at different lengths under this member so that it can only cooperate correctly with the said head for one predetermined angular position between the valve and the cap.

The step is preferably delimited by a wall parallel to the direction of depression of the head and to the axis of the outlet orifice of the head, directed substantially perpendicularly to the direction of depression of the head, this step being offset laterally with respect to the axis of the head.

The elements of the supporting means provided under the actuating member advantageously comprise two flanges of different heights, the smaller flange being adapted to press against the distributor head, while the larger flange is adapted to engage with the wall of the step in order to give the head the appropriate angular direction.

According to a variant embodiment, the distributor head is provided with an outlet tube coaxial with the head and parallel to the direction of depression of the head, while the opening of the cap is formed in the actuating member forming the lever and is traversed by the outlet tube projecting to the exterior.

The outlet tube is advantageously provided at its base with a collar surrounding the tube and against which the actuating member rests by means of flanges.

The collar may have guide means, especially grooves, capable of cooperating with the flanges of the actuating member in order to hold the collar and the outlet tube in an angular direction.

According to another possibility, the collar is substantially circular, and its upper surface is smooth, the collar being adapted to cooperate with the flanges of the actuating member irrespective of the angular direction of the outlet tube and the distributor head about its axis.

The cap advantageously comprises an attachment means for the rear part of the lever in order to lock this lever in the position of rest and to prevent any action on the distributor head, wherein the release of the lever with respect to the attachment means can be obtained by means of slight deformation, particularly of the rear wall of the lever.

The said attachment means may consist of a nose provided on the inner wall of the cap.

The lever is advantageously in the shape of a right dihedron included between two walls converging slightly towards the rear, the upper face of the dihedron being hinged at the front on to the cap by means of a film hinge, while the other face of the dihedron, situated at the rear and substantially vertical when the container is vertical, is attached by means of its lower edge to the attachment means of the cap. This cap has a notch adapted to leave visible the greater part of the lever/-push-button which substantially completes the contour of the cap at this notch.

The cap provided with the lever is preferably snap-engaged on the container.

In addition to the arrangements described hereinabove, the invention consists of a number of other arrangements which will be described in more detail hereinafter by way of non-limiting embodiments described with reference to the accompanying drawings, in which:

DETAILED DESCRIPTION OF THE INVENTION

Figure 1:
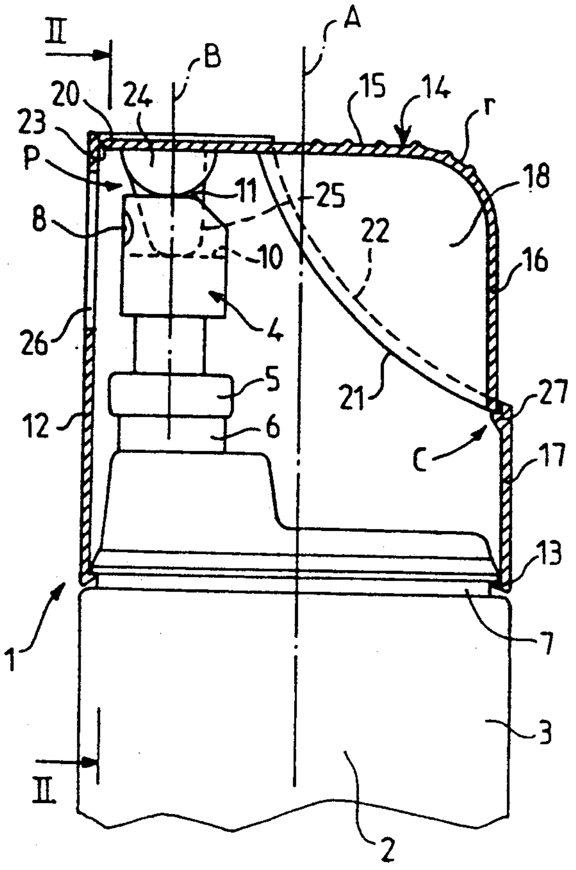
FIG. 1 is a sectional view along the line I—I of FIG. 3, with portions viewed from the exterior, of a device for spraying a liquid product in fine droplets according to the invention.
Figure 3:
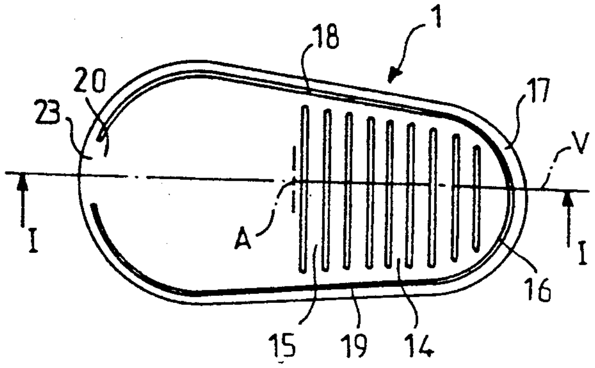
FIG. 3 is a top view of the device of FIG. 1.

Referring to the drawings, especially to FIG. 1, they show a device 1 for spraying a liquid product in fine droplets, this product being contained in a container 2 or bottle, generally of plastic material. The transverse section of the container 2 has a contour which can be seen in FIG. 3 and the shape of which is asymmetrical with respect to a longitudinal axis A of the container. According to FIG. 1, this axis A is vertical. It passes through the centre of a circle tangential to the front end and to the rear end of the transverse section of the container. The front part of the container, situated on the left according to the representation of FIGS. 1 and 3, has a substantially semi-circular transverse section, while the rear part 3 also has a substantially semi-circular transverse section, but with a smaller radius. The two lateral faces extending between the front and rear parts are planar and converge towards the rear.

The container 2 has a vertical plane of symmetry V passing through the axis A and the front and rear end edges of this container.

It should be noted that the term "front" refers to the side at which the liquid is delivered and that the term "rear" refers to the opposite side.

The container 2 is provided in its upper part with a distributor head 4 formed in the example in question by the head of a pump the body of which is crimped at 5 on to an outlet tube 6 of the container 2. The tube 6 and the head 4 coaxial to the tube are offset towards the front relative to the axis A of the container.

The container 2 is provided below the head 4 with a snap groove 7.

The head 4 can be pressed into the pump body in order to deliver the finely atomised liquid through an outlet orifice 8 provided laterally in this head 4, in a direction perpendicular to the direction of depression.

Figure 2:
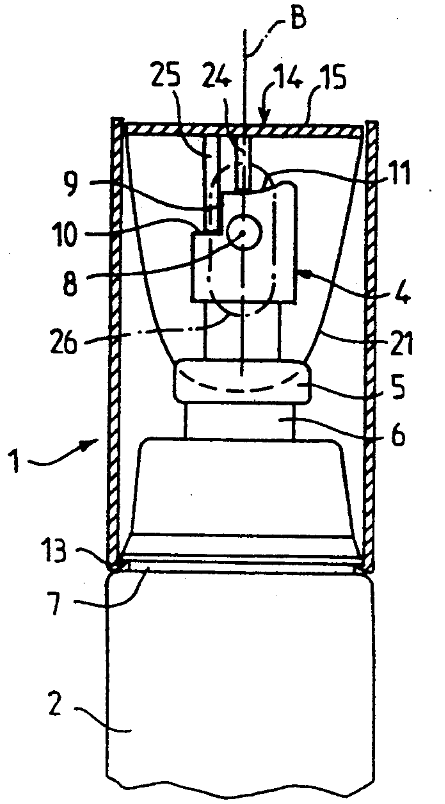
FIG. 2 is a section along the line II—II of FIG. 1, with portions viewed from the exterior.

The head 4 can rotate about an axis B parallel to the direction of depression. The upper part of the head 4 is asymmetrical with respect to this axis B, as is clear in FIG. 2. It comprises on its upper surface a step 9 defining two zones 10, 11, lower and upper zones respectively. The step 9 forming a passage from one zone to the next is formed by a portion of wall parallel to the axis B and to the axis of the outlet orifice 8. The step 9 is offset laterally with respect to the axis B. The zone 11 may display slight concavity directed upwards.

The device moreover comprises a cap 12 capable of covering the container and the distributor head, snapping into the groove 7 by means of lower beading 13.

The cap 12, generally of plastic material, has a transverse section similar to that of the container 2 so as to extend the body of the container when this cap is in place.

The cap 12 is provided with an actuating member for the distribution valve, formed by a lever 14.

This lever 14 is in the shape of a right dihedron having a horizontal upper face 15 when the container 2 is vertical and a rear vertical face 16. The two faces are joined together by a surface which is convex towards the exterior r. The upper face 15 is planar while the rear face 16 is substantially semi-cylindrical so as to be inscribed in the inner contour of the rear face 17 of the cap, which is similar to the rear face 3 of the container.

The faces 15 and 16 are included between two planar walls 18, 19 converging slightly towards the rear and substantially tangential on the inside to the lateral walls of the cap. The walls 18 and 19 extend as far as the lower edge of the rear face 16, although stopping at a certain distance to the rear of the front edge 20 of the upper face 15. These lateral walls 18, 19 are defined by an edge 21 in the shape of the arc of a circle.

The cap 12 comprises in its rear part towards the top a notch defined by a contour 22 substantially in the shape of the arc of a circle, situated slightly above the edge 21 when the lever 14 is in the position of rest. This notch makes it possible to leave visible the greater part of the lever/push-button 14 which substantially completes the contour of the cap 12 at this notch.

The lever 14 is hinged at the central part of its front edge 20 on to the front wall of the cap 12, preferably by means of a film hinge 23 (see FIG. 3), so that the cap 12 and the lever 14 can be integrally moulded with one another.

The lever 14 comprises under its upper face 15 a supporting means P for applying pressure to the head 4 and depressing the distribution valve.

The supporting means P comprises two flanges 24, 25 of different heights, perpendicular to the face 15 and parallel to the plane V. The smaller flange 24 is in the shape of a semi-circle directing its convexity downwards and has the plane V as its median plane. This flange 24 is adapted to press against the upper zone 11 of the head 4.

The other larger flange 25, offset transversely with respect to the flange 24, is adapted to engage with the wall of the step 9 in order to give the head 4 the appropriate angular direction. This flange 25 has a substantially trapezoidal shape. When its plane abuts laterally against the step 9, itself planar, the axis of the outlet orifice 8 is situated in the vertical plane of symmetry V.

The cap 12 comprises in its front peripheral wall an opening 26 substantially in the shape of a rectangle having rounded edges, the large dimension of which is directed vertically. This opening has the plane V as its plane of symmetry and is situated opposite the outlet orifice 8 when the various elements have been assembled in the correct angular position.

The cap 12 comprises at the rear an attachment means C for the rear part of the lever 14 in order to lock this lever in the position of rest and to prevent any action on the head 4. The release of the lever with respect to this attachment means C is obtained by means of slight deformation of the rear wall 16 of the lever, by means of thrust.

The attachment means C is advantageously formed by a nose 27 provided on the inner surface of the rear wall 17 of the cap in its upper part, capable of cooperating with the lower edge of the rear face 16 of the lever 14.

The mounting of the cap on the container 2 and the operation of the device will be immediately clear from the preceding description.

The asymmetrical shape of the transverse section of the container 2 and of the corresponding transverse section of the cap 12 mean that the cap can only be mounted on the container in one single predetermined angular direction, the opening 26 being situated towards the front and the face 16 of the lever being situated towards the rear. This shape of the transverse section of the container and the cap therefore forms a guide means between the cap and the container.

Moreover, the cap can only be placed correctly on the container if the head 4 is aligned correctly with the axis of its outlet orifice 8 situated in the vertical plane V so that the flange 25 can engage with the step 9. The step 9 therefore forms an angular positioning means for the head 4 cooperating with the supporting means P of the lever which comprises the flange 25.

With mounting effected in this manner, the outlet orifice 8 is situated opposite the opening 26. The head 4 can no longer rotate about the axis B.

In order to actuate the device and to obtain spraying, the rear part of the upper surface 15 of the lever 14 simply has to be pressed in order to depress the head 4.

Figure 4:
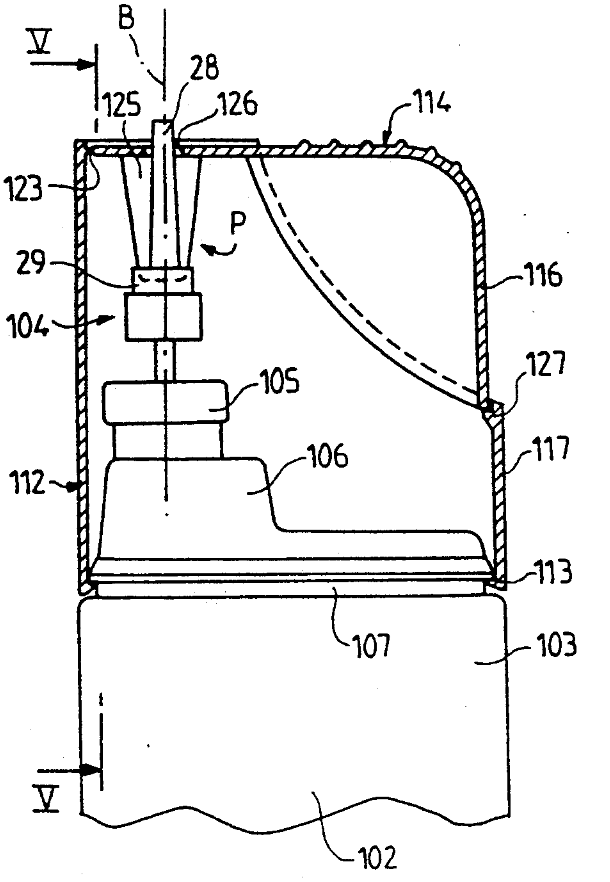
FIG. 4 is a sectional view along the line IV—IV of FIG. 6, with portions viewed from the exterior, of a variant embodiment of the device.
Figure 5:
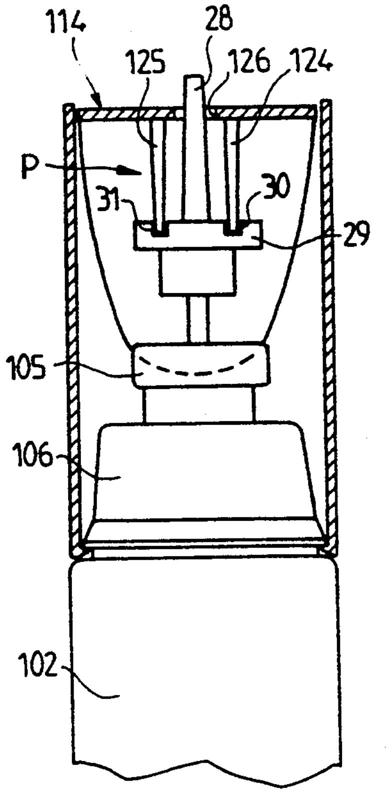
FIG. 5 is a section along the line V—V of FIG. 4, with portions viewed from the exterior.
Figure 6:
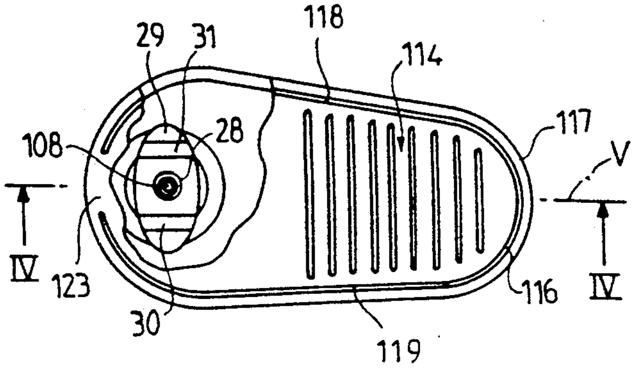
FIG. 6 is a top view, with broken away portions, of the device of FIG. 4, and, finally

FIGS. 4 to 6 show a variant embodiment, in which those elements identical with or playing an equivalent role to elements already described with reference to the preceding figures have been designated by reference numerals equal to the sum of the number 100 and the reference numeral used previously. These elements will not be described again, or will be described only briefly.

The distributor head 104 is provided with an outlet tube 28 coaxial with the head and parallel to the direction of depression of the head. The tube 28 may be truncated on the exterior and its outer diameter may decrease in the direction away from the head 104. The tube 28 has an inner passage 108 of constant circular section.

The opening 126 of the cap 112 is no longer formed in the continuous peripheral wall, but in the upper part of the cap formed by the actuating member or lever 114. The opening 126 is circular and has a diameter greater than that of the part of the tube 28 traversing this opening and projecting beyond the lever 114. The diameter of the opening 126 is sufficient to allow for clearance of the lever 114 without interference with the tube 28.

The tube 28 is provided at its base with a collar 29 surrounding the tube with which it is integral and against which the flanges 124, 125 of the lever 114 rest, said flanges having the same height. The flanges 124, 125 are disposed on either side of the tube 28. In the embodiment of FIGS. 4 to 6, the collar 29 has an oval or substantially elliptical shape, the large axis of which is adapted to be placed perpendicularly to the vertical plane of symmetry V of the container, this plane corresponding to the line IV—IV in FIG. 6. The collar 29 has guide means, advantageously formed by grooves 30, 31 provided on its upper surface, capable of cooperating with the flanges 124, 125 in order to hold the collar 29 in the position shown in FIG. 6. When the position of the collar 29 is correct, the bases of the flanges 124, 125 are received in the grooves 30, 31 respectively.

Figure 7:
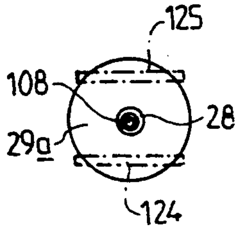
FIG. 7 is a partial top view of a variant embodiment of the distributor head collar.

As a result of the fact that with the arrangement of FIG. 4, the rotation of the outlet tube 28 about its axis does not cause any interference, the grooves can advantageously be dispensed with. As illustrated in FIG. 7, the head 104 can be provided with a circular or substantially circular collar 29*a* having a diameter at least equal to the distance between the outer faces of the flanges 124, 125. In this manner, irrespective of the angular direction of the tube 28 about its axis, there will always be cooperation of the flanges 124, 125 and the collar 29*a* and therefore actuation of the head 104 by the lever 114.

The device according to the invention has a certain number of advantages.

Directional spraying can be obtained. The fulcrum of the lever, for the user, situated to the rear, makes it possible to obtain great flexibility of use, thereby ensuring fine spraying by virtue of complete ejection of the precompressed dose. The pressure exerted on the head is always directed along the axis B of this head. The quality of the products sprayed is thereby improved.

This device is ergonomic, particularly by virtue of the shape of the transverse section of the push-button and the bottle, and thereby allows for prolonged use without exertion.

This device can be used by means of long nails, or with the thumb or the index finger while being held in one hand, irrespective of whether the user is right- or left-handed.

The attachment device formed by the nose 27, 127 forms an invisible opening/closing system.

The spraying device according to the invention will be supplied in the closed position, i.e. the lever 14, 114 attached to the nose 27, 127. Simple pressure on the rear face 16, 116 will be sufficient to bring the device into the operating position. In order to return to the "closed" position, e.,g. for transportation of the device when travelling, the cap 14, 114 simply has to be raised slightly in order to ensure attachment to the nose 27, 127.

I claim:

1. A device for spraying a liquid product in fine droplets such as a hair product, comprising a container for the product, said container having at one end a dispensing head having a dispensing opening and movable along an axis toward said one end to effect dispensing of the product and away from said one end to terminate dispensing, said dispensing head including a stem about which said head is rotatable, a cap mounted on said one end, said cap being attached to said one end of said container and enclosing said dispensing head, said cap including a lever having interiorly of said cap, supporting means engaging said head, said lever being movable about a hinge means toward said one end to move said supporting means to thereby move said head toward said one end of said container to effect dispensing, said cap having an outlet through which the product is dispensed upon movement of said lever toward said one end, said container having a longitudinal axis and said head being offset at said one end relative to said longitudinal axis, said cap having guide means for aligning said outlet with said dispensing head when said cap is mounted on said one end, said guide means comprising a peripheral wall on said cap and a mating peripheral edge on said one end of said container allowing one position of mounting of said cap on said one end with said outlet of said cap aligned with said dispensing opening of said dispensing head, said peripheral edge of said one end being asymmetrically shaped about said longitudinal axis of said container;

said dispensing opening of said head facing in a direction transverse to said longitudinal axis of said container, so as to dispense the product in said direction, said axis of movement of said head and said longitudinal axis extending parallel to one another;

said support means including a first and a second arm element extending from said lever with said first arm element being of greater length than said second arm element, said head having a side remote from said container, said side being formed with a step separating a first contact zone being closer to said one end of said container than said second contact zone so that, when said supporting means is in engagement with said dispensing head, said first arm element is engageable with said first contact zone and said second arm element is engageable with said second contact zone, said step including a wall extending parallel to the axis of movement of said head, said wall being offset laterally relative to said axis of movement of said head.

2. A device for spraying a liquid product in fine droplets such as a hair product, comprising a container for the product, said container having at one end a dispensing head having a dispensing opening and movable along an axis toward said one end to effect dispensing of the product and away from said one end to terminate dispensing, said dispensing head including a stem about which said head is rotatable, a cap mounted on said one end, said cap being attached to said one end of said container and enclosing said dispensing head, said cap including a lever having interiorly of said cap, supporting means engaging said head, said lever being movable about a hinge means toward said one end to move said supporting means to thereby move said head toward said one end of said container to effect dispensing, said cap having an outlet through which the product is dispensed upon movement of said lever toward said one end, said container having a longitudinal axis and said head being offset at said one end relative to said longitudinal axis, said cap having guide means for aligning said outlet with said dispensing head when said cap is mounted on said one end, said guide means comprising a peripheral wall on said cap and a mating peripheral edge on said one end of said container allowing one position of mounting of said cap on said one end with said outlet of said cap aligned with said dispensing opening of said dispensing head, said peripheral edge of said one end being asymmetrically shaped about said longitudinal axis of said container;

said dispensing opening of said head facing in a direction transverse to said longitudinal axis of said container, so as to dispense the product in said direction, said axis of movement of said head and said longitudinal axis extending parallel to one another;

said supporting means including a first and a second arm element extending from said lever with said first arm element being of greater length than said second arm element, said head having a side remote from said container, said side being formed with a step separating a first contact zone and a second contact zone, with said first contact zone being closer to said one end of said container than said second contact zone so that, when said supporting means is in engagement with said dispensing head, said first arm element is engageable with said second contact zone, said step including a wall extending parallel to the axis of movement of said head, said first arm element comprising a planar flange having a side surface engaging said wall to assist in orienting said cap on said one end of said container.

3. A device for spraying a liquid product in fine droplets such as a hair product, comprising a container for the product, said container having at one end a dispensing head having a dispensing opening and movable along an axis toward said one end to effect dispensing of the product and away from said one end to terminate dispensing, said dispensing head including a stem about which said head is rotatable, a cap mounted on said one end, said cap being attached to said one end of said container and enclosing said dispensing head, said cap including a lever having interiorly of said cap, supporting means engaging said head, said lever being movable about a hinge means toward said one end to move said supporting means to thereby move said head toward said one end of said container to effect dispensing, said cap having an outlet through which the product is dispensed upon movement of said lever toward said one end, said container having a longitudinal axis and said head being offset at said one end relative to said longitudinal axis, said cap having guide means for aligning said outlet with said dispensing head when said cap is mounted on said one end, said guide means comprising a peripheral wall on said cap and a mating peripheral edge on said one end of said container allowing one position of mounting of said cap on said one end with said outlet of said cap aligned with said dispensing opening of said dispensing head;

said stem of said dispensing head comprising an outlet tube which is coaxial with said head and extending parallel to the axis of movement of said head, said lever having an outlet opening, said outlet tube extending through said outlet opening of said lever exteriorly of said cap, said outlet tube having interiorly of said cap a collar surrounding said tube, said collar having guide grooves formed therein with said supporting means including flanges each engaging a said guide groove of said collar.

4. The invention as claimed in claim 1, 2 or 3 wherein said lever has a rear portion remote from said hinge means aid said cap includes attachment means for locking said rear portion of said lever, said rear portion being deformable by a user to release said rear portion from said attachment means.

5. The invention as claimed in claim 4 wherein said cap includes a rear edge and said attachment means comprises a recess formed on said rear edge for engaging and retaining said rear portion of said lever.

6. The invention as claimed in claim 4 wherein said lever has the shape of right dihedron including spaced side walls, said lever having a rear portion with said side walls converging toward said rear portion, said hinge means being located remote from said rear portion of said lever and comprising a film hinge, said cap having an upper face and said lever having a wall portion defining said upper face and a rear wall extending substantially perpendicular to said upper face.

7. The invention as claimed in claim 1, 2 or 3 wherein said cap has an upper face and a rear portion with an arcuately extending continuous edge between said upper face and said rear portion, said lever having spaced side walls each with an arcuate lower edge extending adjacent said continuous edge of said cap.

* * * * *